S. M. SILBERBERG.
GRATER.
APPLICATION FILED MAR. 28, 1911.

1,008,438.

Patented Nov. 14, 1911.

Witnesses:
Clarence J. Williams
J. T. Buttress

Inventor,
Saul M. Silberberg
by Anton Gloetzner
Attorney.

COLUMBIA PLANOGRAPH CO., WASHINGTON, D. C.

UNITED STATES PATENT OFFICE.

SAUL M. SILBERBERG, OF LOS ANGELES, CALIFORNIA.

GRATER.

1,008,438.

Specification of Letters Patent. Patented Nov. 14, 1911.

Application filed March 28, 1911. Serial No. 617,509.

*To all whom it may concern:*

Be it known that I, SAUL M. SILBERBERG, a citizen of Austria, residing at Los Angeles, in the county of Los Angeles and State of California, have invented a certain new and useful Grater, of which the following is a specification.

My invention relates to a culinary utensil and particularly to a grater for vegetables and fruits.

An object of this invention is to provide a grater of few parts, and especially a holding means for the material to be grated, by means of which fruits and vegetables may be entirely reduced to a grated mass without leaving any ungrated portion and without injuring the hands.

Another object of this invention is to provide a grater which requires no extraneous support, and to couple with such grater a holding means for the material to be grated, that may be attached directly to the grater, eliminating thereby a supplemental support for such holding means, which tends to obstruct the free passage of the grated material through the openings in the grating surface, and which renders cleaning of the utensil difficult.

With these and other objects in view, this invention consists of the features, details of construction, and combination of parts, described in connection with the accompanying drawing and then more particularly pointed out in the claims.

Figure 1:
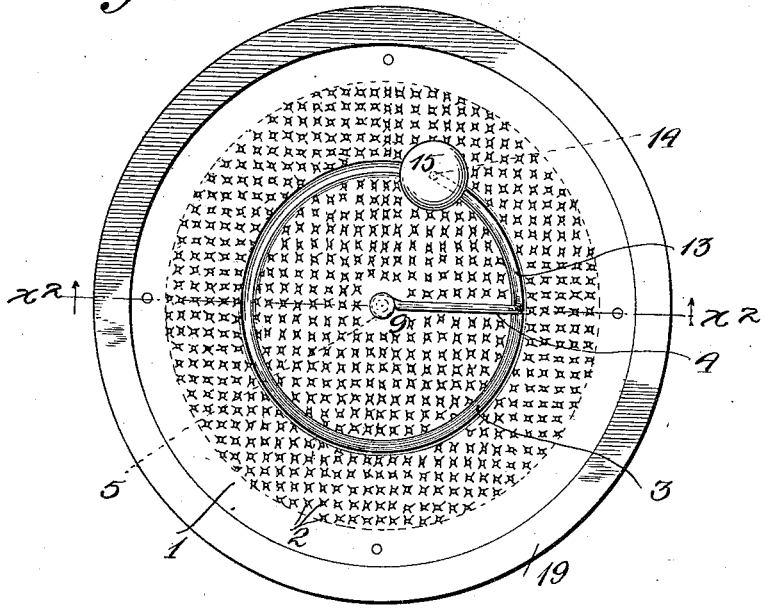
Figure 2:
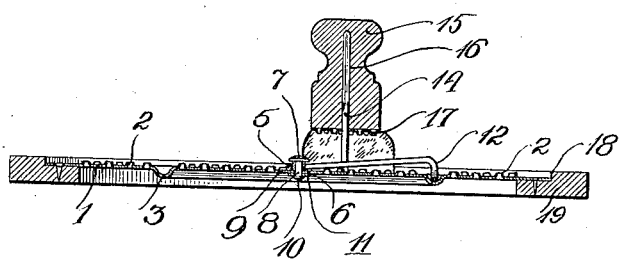

In the drawing, Figure 1, is a plan view of my invention, and Fig. 2, is a section on line X²—X², Fig. 1, the knob also being shown in section to illustrate the aperture therein.

The invention comprises a flat disk 1, having a rough grating surface of outwardly dented holes 2. Said disk 1, is provided with a concentric concave groove 3, forming a trackway for a holder 4, which consists of a strand of wire having a loop 5 on one end, which loosely encircles a bushing 6, disposed between the head 7, of a rivet 8, and the top smooth portion 9, of the grater. Between the bottom of said smooth portion and the upset portion 10, of the rivet, is a washer 11, which when the headless end of the rivet is flattened tends to tighten and hold the bushing 6, against movement. Thus the loop 5, of the wire strand may be rotated about such bushing, which remains stationary, and because such rivet is stationarily secured in the grater, the hole made by the rivet is not expanded or enlarged by continued rotation of the holder about its pivot. By this construction the necessity for using a support for the central portion of the grater and also for the fastening means for the holder thereof is obviated, consequently there can be no clogging of the grated material, and the grater may readily be cleaned. Said strand of wire extends from the central pivot at an angle to and free of the surface of the grater, as shown in Fig. 2, being then bent downwardly, as seen at 12, and then in a curve 13, corresponding with the curvature of the groove 3, in which such curved portion normally rests, said groove forming a guideway for such curved portion during the rotatory grating movement of the holder 4. Such curved portion 13, terminates in a prong 14, extending at right angles to the surface of the grater, such prong being arranged to pierce the material to be grated. A knob 15, having a central aperture 16, is arranged to loosely fit on said prong 14, and is provided with a grating face 17, whereby the grating of the material may occur on top as well as on the bottom of the substance to be grated. By the use of this knob, all of the material may be quickly grated the prong of the holder, gradually sliding into the aperture thereof as the material is reduced.

If desired the grater may be fastened in the rabbet 18, of an annulus 19, so that the grating of the material may be conducted either in flat or tilted position of the grater.

What I claim, is:—

1. A grater comprising a metallic disk having a rough surface of outwardly dented holes and an annular groove, and a prong for piercing the material to be grated pivoted centrally of and extending at right angles to said disk, said prong normally resting in and arranged to be rotated in said groove to grate the material thereon.

2. A grater comprising a metallic disk having a roughened face and an imperforate annular groove, and a holding means for material to be grated comprising a strand of wire having one end pivotally connected centrally of said disk, an intermediate portion curved to conform with and operating in said groove, and a prong contiguous with said intermediate portion.

3. A grater comprising a disk having a roughened face and an annular groove, a prong for holding material to be grated pivoted centrally of said disk and normally resting and arranged to operate in said groove, said prong being free of the face of said disk, and a knob having a roughened face and an aperture of equal length with said prong, said knob face being arranged to coöperate with said grater.

4. A grater comprising a flat disk having an annular groove and a means for holding the material to be grated, said means comprising a strand of wire pivoted centrally of said grater and extending at an angle from such center and free of the surface thereof, and being bent upon itself in a curve conforming with and arranged to fit in said groove, such curve terminating in an upright prong.

In testimony whereof I affix my signature in the presence of two witnesses.

SAUL M. SILBERBERG.

Witnesses:
  MAE SILBERBERG,
  F. J. McCLARY.

Copies of this patent may be obtained for five cents each, by addressing the "Commissioner of Patents, Washington, D. C."